(12) United States Patent
Li et al.

(10) Patent No.: US 9,819,730 B2
(45) Date of Patent: Nov. 14, 2017

(54) SYSTEM AND METHOD FOR NETWORK ACCESS BASED ON APPLICATION LAYER DATA

(71) Applicant: TENCENT TECHNOLOGY (SHENZHEN) COMPANY LIMITED, Shenzhen (CN)

(72) Inventors: Wenzheng Li, Shenzhen (CN); Zhiwu Chen, Shenzhen (CN); Yue Wu, Shenzhen (CN); Ming Xie, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 475 days.

(21) Appl. No.: 14/512,488

(22) Filed: Oct. 13, 2014

(65) Prior Publication Data

US 2015/0032807 A1    Jan. 29, 2015

Related U.S. Application Data

(63) Continuation of application No. PCT/CN2012/087969, filed on Dec. 31, 2012.

(30) Foreign Application Priority Data

Apr. 13, 2012    (CN) .......................... 2012 1 0107723

(51) Int. Cl.
*G06F 15/16*    (2006.01)
*H04L 29/08*    (2006.01)
*H04L 29/06*    (2006.01)

(52) U.S. Cl.
CPC .......... *H04L 67/10* (2013.01); *H04L 67/1002* (2013.01); *H04L 67/42* (2013.01)

(58) Field of Classification Search
CPC ...... H04L 67/42; H04L 63/0281; H04L 69/16
USPC .................................................. 709/201, 203
See application file for complete search history.

(56) References Cited

U.S. PATENT DOCUMENTS

2003/0014650 A1*    1/2003    Freed ..................... H04L 29/06
                                                                713/189

FOREIGN PATENT DOCUMENTS

| CN | 101252591 A | 8/2008 |
|---|---|---|
| CN | 101296238 A | 10/2008 |
| WO | 2011066435 A2 | 6/2011 |

OTHER PUBLICATIONS

International Search Report for Application No. PCT/CN2012/087969 dated Mar. 28, 2013, and its English translation thereof.

\* cited by examiner

*Primary Examiner* — Wing F Chan
*Assistant Examiner* — Andrew Woo
(74) *Attorney, Agent, or Firm* — Harness, Dickey & Pierce, P.L.C.

(57) ABSTRACT

A system providing network access based on application layer data, including at least one client device, an access server, and a background server group. The client device is configured to establish a TCP connection with the access server and send a data request to the access server through the TCP connection. The access server is configured to select a background sever serving the client device from the background server group according to the data request, and send TCP information initiated in the TCP connection to the selected background server. The selected background server is configured to directly send data to the client device according to the TCP information.

8 Claims, 1 Drawing Sheet

SYSTEM AND METHOD FOR NETWORK ACCESS BASED ON APPLICATION LAYER DATA

CROSS-REFERENCE TO RELATED APPLICATIONS

This application is a continuation of International Application No. PCT/CN2012/087969 filed on Dec. 31, 2012. This application claims the benefit and priority of Chinese Application No. 201210107723.2, filed Apr. 13, 2012. The entire disclosures of each of the above applications are incorporated herein by reference.

FIELD

The present disclosure relates to communication technologies and to a system and method for network access based on application layer data.

BACKGROUND

This section provides background information related to the present disclosure which is not necessarily prior art.

Transmission Control Protocol (TCP) is a connection-oriented, reliable and octet stream based communication protocol, and is specified by the Request For Comments (RFC) 793 of Removal of Industrial Exception Task Force (RIETF) of Internet Engineering Task Force (IETF). In a simplified Open System Interconnection (OSI) Reference Model, TCP provides functions of the transport layer.

TCP specifies that it is required to establish a connection before sending application layer data. In order to establish the connection, multiple information synchronization processes should be performed between both communicating parties, which is generally called a three-step handshake. During the three-step handshake, two or three network data packets, not including the application layer data, are exchanged.

In a conventional solution for network access, an access server does not access the application layer data, but performs scheduling when receiving the first data packet for establishing the connection. In TCP, the first data packet is the first data packet during the three-step handshake. Through scheduling, the access server selects a background server serving this connection, and then all data packets belonging to the same connection are forwarded to the selected background server via the access server. During network access based on the application layer data, when the access server receives a data packet of the three-step handshake, the access server is unable to select a background server serving this connection, because the data packet does not include the application layer data. Herein, the network access based on the application layer data means that the access server needs to access the application layer data to determine a forwarding target before forwarding data.

Conventional solutions exist for network access based on the application layer data. In these solutions, the access server establishes a first TCP connection with a client device through the three-step handshake first, and then receives the application layer data through the first TCP connection. The access server obtains data for scheduling from the application layer data and selects a background server according to the obtained data. The selected background server is a target server to which the application layer data is to be forwarded. The access server then establishes a second TCP connection with the background server through the three-step handshake. Afterwards, the background server sends data to the access server through the second TCP connection, and the access server sends the data to the client device through the first TCP connection. Through this method, the network access of the client device may be implemented.

However, these solutions for network access based on the application layer data raise the following considerations.

The access server needs to establish the TCP connection respectively with the client device and the background server through the three-step handshake. Accordingly, the implementation is complex.

Because the access server needs to establish the TCP connection respectively with the client device and the background server, significant CPU and memory resources are required. Further, because the data receiving and sending process requires additional memory resources, and input-output traffic all pass through the access server, the efficiency of the access server is low and, thus, the access server may easily become a bottleneck.

Because the background server and the client device cannot communicate directly, but communicate through the access server, these available options for network access are complex for the background server.

SUMMARY

This section provides a general summary of the disclosure, and is not a comprehensive disclosure of its full scope or all of its features.

Embodiments of the present disclosure provide a system and method for network access based on application layer data, thereby decreasing the complexity of implementation. The system and method for network access based on application layer data are implemented as follows.

A system for network access based on application layer data includes at least one client device, an access server and a background server group;

the client device is configured to establish a Transmission Control Protocol (TCP) connection with the access server, and send a data request to the access server through the TCP connection;

the access server is configured to select a background server serving the client device from the background server group according to the data request, and send TCP information initiated in the TCP connection to the selected background server; and the selected background server is configured to directly send data to the client device according to the TCP information.

A method for network access based on application layer data includes:

establishing, by a client device, a Transmission Control Protocol (TCP) connection with an access server, and sending a data request to the access server through the TCP connection;

selecting, by the access server, a background server serving the client device according to the data request, and send TCP information initiated in the TCP connection to the selected background server; and sending, by the selected background server, data directly to the client device according to the TCP information.

As can be seen from the above, the client device first establishes the TCP connection with the access server, and sends the data request to the access server through the TCP connection. The access server selects the background server serving the client device from the background server group according to the data request, and then sends the TCP information initiated in the TCP connection to the selected background server. The selected background server directly sends data to the client device according to the TCP information. In the various embodiments, the background server does not perform the three-step handshake with the access server, but directly communicates with the client device according to the TCP information, thereby implementing network access. In this way, the access server only needs to establish the TCP connection with the client device, but does not needs to establish the TCP connection with the background server, thereby decreasing the complexity of implementation.

Because the access server only establishes the TCP connection with the client device, but does not establish the TCP connection with the background server, the requirements of CPU and memory resources is decreased. Further, because the output traffic of the background server does not pass through the access server, the efficiency of the access server is improved.

Because it is not through the access server that the background server sends data to the client device, the background server deems that it communicates with the client device directly and, thus, the communication between the background server and the client device is simple for the background server.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

In order to make the technical solution and merits of the present disclosure clearer, the present disclosure will be illustrated in detail hereinafter with reference to the accompanying drawings and various embodiments.

Figure 1:
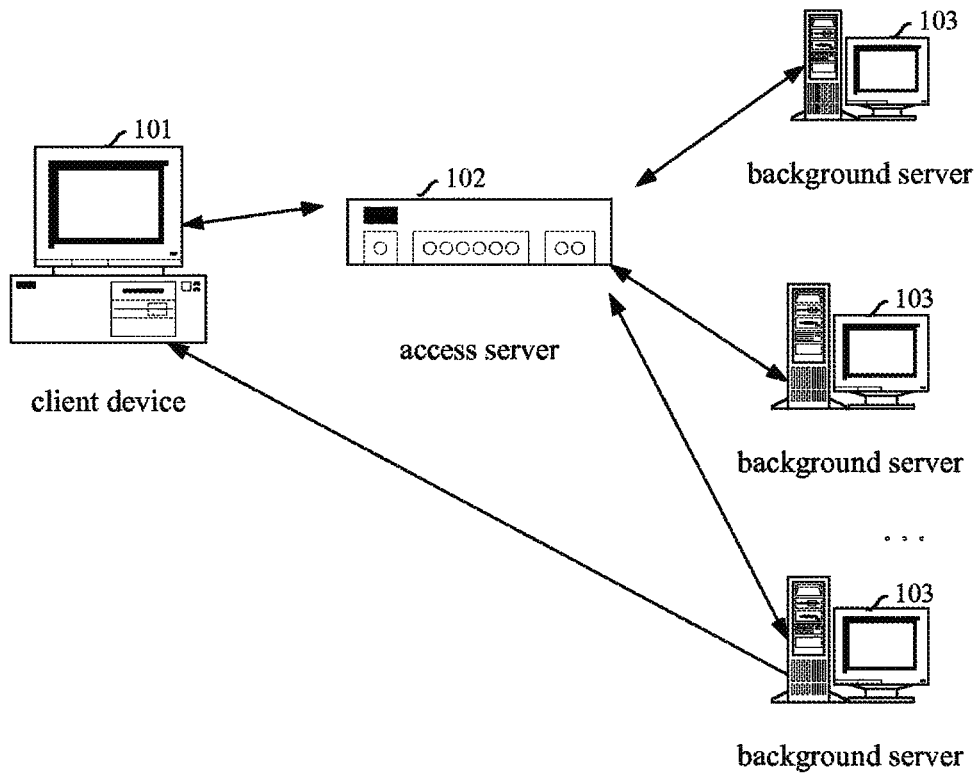
FIG. 1 is a block diagram illustrating the structure of a system for network access based on application layer data according to various embodiments of the present disclosure.

FIG. 1 is a diagram illustrating the structure of a system for network access based on application layer data according to various embodiments of the present disclosure.

As shown in FIG. 1, the system includes a client device 101, an access server 102, and a background server group. The background server group includes at least two background servers 103. The client device 101 establishes a TCP connection with the access server 102 and sends a data request to the access server 102 through the TCP connection. The access server 102 selects a background sever 103 serving the client device 101 from the background server group according to the data request, and sends TCP information initiated in the TCP connection to the selected background server. For example, the selected background server in FIG. 1 may be the down most background server. The selected background server 103 directly sends data to the client device 101 according to the TCP information.

In various embodiments, the access server 102 obtains forwarding scheduling information from the application layer contents of the data request sent by the client device 101, and selects the background server 103 serving the client device 101 according to the forwarding scheduling information. In various embodiments, the forwarding scheduling information may include a domain name, cookie information, and an instant messaging number of a server. The access server 102 selects the background server 103 serving the client device 101 according to the domain name, the cookie information, and the instant messaging number of the server. In another example, the access server 102 may select the background server 103 serving the client device 101 according to another mode such as a load balancing mode.

In various embodiments, the TCP information includes an IP address and a port of the client device 101. The selected background server 103 may obtain the IP address and the port of the client device 101 from the TCP information, and then directly send a data packet to the client device 101 according to the IP address and port of the client device 101. In various embodiments, the TCP information may further include at least one piece of following information. The information includes a data order number of the client device, a data order number of which the access server informs the client device when handshaking with a proxy, Maximum Segment Size (MSS), flow window size of the client device, flow window size of which the access server informs the client device, supporting a time stamp or not, Selective Acknowledgement (SACK), Explicit Congestion Notification (ECN), and window zoom.

According to the above system, various embodiments of the present disclosure provides a method for network access based on application layer data.

Figure 2:
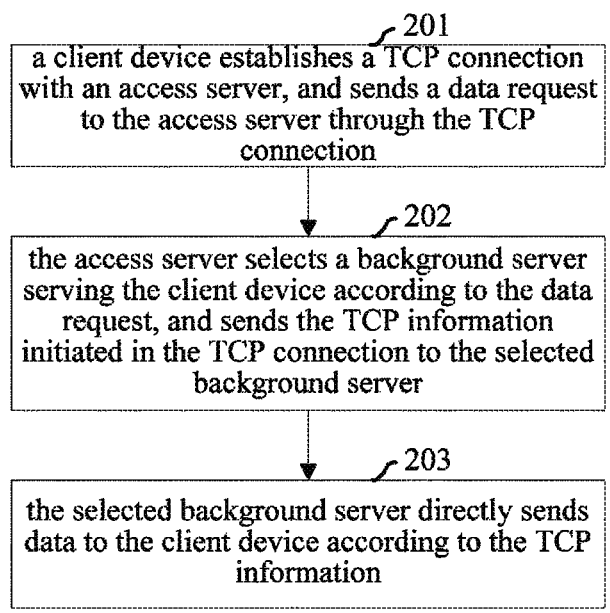
FIG. 2 is a flowchart illustrating a method for network access based on application layer data according to various embodiments of the present disclosure.

FIG. 2 is a flowchart illustrating a method for network access based on application layer data according to various embodiments of the present disclosure.

As shown in FIG. 2, the method includes the following blocks.

At block 201, a client device establishes a TCP connection with an access server and sends a data request to the access server through the TCP connection. In various embodiments, the client device establishes the TCP connection with the access server through the three-step handshake. The three-step handshake is described as follows.

In the first-step, the client device sends a SYN packet (at this time, syn=j) to the access server and the client device enters a SYN_SEND state and waits for the confirmation from the access server.

In the second-step, the access server receives the SYN packet, confirms the SYN packet of the client device (at this time, ack=j+1), and sends a SYN packet (at this time, syn=k) to the client device. The SYN packet sent by the access server is a SYN+ACK packet. At this time, the access server enters a SYN_RECV state.

In the third-step, the client device receives the SYN+ACK packet from the access server and sends an ACK packet (at this time, ack=k+1) to the access server. Afterwards, the client device and the access server both enter an ESTABLISHED state. After the three-step handshake, the client device and the access server may communicate with each other.

During the three-step handshake, the client device and the access server negotiate the TCP information, and the access server saves the negotiated TCP information to send to a background server. In an example, the TCP information includes an IP address and a port of the client device. In another example, the TCP information may further include an order number, a confirmation number, or a check word.

At block 202, the access server selects a background sever serving the client device according to the data request and sends the TCP information initiated in the TCP connection to the selected background server.

At block 203, the selected background server directly sends data to the client device according to the TCP information.

In various embodiments, the selected background server obtains the IP address and the port of the client device from the TCP information first, and then sends a data packet to the client device according to the IP address and the port of the client device. As can be seen, after receiving the TCP information from the access server, the background server does not perform the three-step handshake with the access server, but generates a request connected to the client device. The kernel of the background server informs a user state of the background server of a message for accessing the background server by the client device. The access server continues to send subsequent data packets of the client device to the background server. The background server directly sends data packets to the client device without needing the access server.

As can be seen from the above solution, the client device first establishes the TCP connection with the access server and sends the data request to the access server through the TCP connection. The access server selects the background server serving the client device from the background server group according to the data request, and then sends the TCP information initiated in the TCP connection to the selected background server. The selected background server directly sends data to the client device according to the TCP information. In the various embodiments, the background server does not perform the three-step handshake with the access server, but directly communicates with the client device according to the TCP information, thereby implementing network access. In this way, the access server only needs to establish the TCP connection with the client device, but does not needs to establish the TCP connection with the background server, thereby decreasing the complexity of implementation.

Because the access server establishes the TCP connection with the client device, but does not establish the TCP connection with the background server, the requirements of CPU and memory resources is decreased. Further, because the output traffic of the background server does not pass through the access server, the efficiency of the access server is improved.

Because it is not through the access server that the background server sends data to the client device, the background server deems that it communicates with the client device directly and, thus, the communication between the background server and the client device is simple for the background server.

The method and system described herein may be implemented by hardware, machine-readable instructions, or a combination of hardware and machine-readable instructions. Machine-readable instructions used in the examples disclosed herein may be stored in storage medium readable by multiple processors, such as a hard drive, CD-ROM, DVD, compact disk, floppy disk, magnetic tape drive, RAM, ROM, or other proper storage device. At least part of the machine-readable instructions may be substituted by specific-purpose hardware, such as custom integrated circuits, gate array, FPGA, PLD, and specific-purpose computers and so on.

A non-transitory computer-readable storage medium is also provided, which is to store instructions to cause a computer device to execute a method as described herein. Specifically, a system or apparatus having a storage medium that stores machine-readable program codes for implementing functions of any of the above examples and that may make the system or the apparatus (or CPU or MPU) read and execute the program codes stored in the storage medium.

In this situation, the program codes read from the storage medium may implement any one of the above examples, thus, the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM, and so on. Optionally, the program code may be downloaded from a server computer via a communication network.

It should be noted that, alternatively to the program codes being executed by a computer, at least part of the operations performed by the program codes may be implemented by an operation system running in a computer following instructions based on the program codes to realize a technical scheme of any of the above examples.

In addition, the program codes implemented from a storage medium are written in a storage in an extension board inserted in the computer or in a storage in an extension unit connected to the computer. In this example, a CPU in the extension board or the extension unit executes at least part of the operations according to the instructions based on the program codes to realize a technical scheme of any of the above examples.

The foregoing is only preferred examples of the present disclosure and is not used to limit the protection scope of the present disclosure. Any modification, equivalent substitution and improvement without departing from the spirit and principle of the present disclosure are within the protection scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A system for network access based on application layer data, comprising:
   at least one client device, an access server, and a background server group;
   wherein the client device establishes a Transmission Control Protocol (TCP) connection with the access server and sends a data request to the access server through the TCP connection;
   wherein the access server obtains forwarding scheduling information from application layer contents of the data request sent by the client device, selects a background server serving the client device from the background server group according to the forwarding scheduling information, and sends TCP information negotiated in the TCP connection to the selected background server, wherein the forwarding scheduling information includes a domain name, cookie information, and an instant messaging number of a server; and
   wherein the selected background server directly sends data to the client device according to the TCP information,
   wherein the TCP information further comprises at least one piece of following information:
   a data order number of the client device, a data order number of which the access server informs the client device when handshaking with a proxy, Maximum Segment Size (MSS), flow window size of the client device, flow window size of which the access server informs the client device, supporting a time stamp or not, Selective Acknowledgement (SACK), Explicit Congestion Notification (ECN) and window zoom.

2. The system of claim 1, wherein the TCP information comprises an Internet Protocol (IP) address and a port of the client device.

3. The system of claim 2, wherein the selected background server is configured to obtain the IP address and the port of the client device from the TCP information, and send the data to the client device according to the IP address and the port of the client device.

4. A method for network access based on application layer data, comprising:
   establishing, by a client device, a Transmission Control Protocol (TCP) connection with an access server, and sending a data request to the access server through the TCP connection;
   obtaining, by the access server, forwarding scheduling information from application layer contents of the data request sent by the client device, selecting a background server serving the client device according to the forwarding scheduling information, and sending TCP information negotiated in the TCP connection to the selected background server, wherein the forwarding scheduling information comprises a domain name, cookie information and an instant messaging number of a server; and
   sending, by the selected background server, data directly to the client device according to the TCP information,
   wherein the TCP information further comprises at least one piece of following information:
   a data order number of the client device, a data order number of which the access server informs the client device when handshaking with a proxy, Maximum Segment Size (MSS), flow window size of the client device, flow window size of which the access server informs the client device, supporting a time stamp or not, Selective Acknowledgement (SACK), Explicit Congestion Notification (ECN) and window zoom.

5. The method of claim 4, wherein the establishing, by the client device, the TCP connection with the access server comprises:
   sending, by the client device, a SYN packet to the access server;
   sending, by the access server, a SYN+ACK packet to the client device after receiving the SYN packet; and
   sending, by the client device, an ACK packet to the access server after receiving the SYN+ACK packet.

6. The method of claim 4, wherein the TCP information comprises an Internet Protocol (IP) address and a port of the client device.

7. The method of claim 6, wherein the sending, by the selected background server, the data to the client device according to the TCP information comprises:
   obtaining, by the selected background server, the IP address and the port of the client device from the TCP information, and sending the data to the client device according to the IP address and the port of the client device.

8. A non-transitory computer-readable storage medium, configured to store instructions to cause a computer device to execute a method comprising:
   establishing, by a client device, a Transmission Control Protocol (TCP) connection with an access server, and sending a data request to the access server through the TCP connection;
   obtaining, by the access server, forwarding scheduling information from application layer contents of the data request sent by the client device, selecting a background server serving the client device according to the forwarding scheduling information, and sending TCP information negotiated in the TCP connection to the selected background server, wherein the forwarding scheduling information comprises a domain name, cookie information and an instant messaging number of a server; and
   sending, by the selected background server, data directly to the client device according to the TCP information,
   wherein the TCP information further comprises at least one piece of following information:
   a data order number of the client device, a data order number of which the access server informs the client device when handshaking with a proxy, Maximum Segment Size (MSS), flow window size of the client device, flow window size of which the access server informs the client device, supporting a time stamp or not, Selective Acknowledgement (SACK), Explicit Congestion Notification (ECN) and window zoom.

* * * * *